(12) United States Patent
Hosier et al.

(10) Patent No.: US 6,847,400 B2
(45) Date of Patent: Jan. 25, 2005

(54) PHOTOSENSITIVE APPARATUS WHEREIN AN INITIAL CHARGE ON A PHOTODIODE IS SAMPLED AND SUBSTRACTED DURING READOUT

(75) Inventors: Paul A. Hosier, Rochester, NY (US); Scott L. TeWinkle, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 778 days.

(21) Appl. No.: 09/815,409

(22) Filed: Mar. 22, 2001

(65) Prior Publication Data

US 2002/0135826 A1 Sep. 26, 2002

(51) Int. Cl.$^7$ .............................................. H04N 3/14
(52) U.S. Cl. ...................................................... 348/313
(58) Field of Search .................................. 348/313, 311, 348/302, 294, 241, 328, 314; 250/208.1

(56) References Cited

U.S. PATENT DOCUMENTS

| | | | | |
|---|---|---|---|---|
| 5,081,536 A | * | 1/1992 | Tandon et al. | 348/313 |
| 5,105,277 A | * | 4/1992 | Hayes et al. | 348/313 |
| 5,148,268 A | * | 9/1992 | Tandon et al. | 348/280 |
| 5,742,047 A | * | 4/1998 | Buhler et al. | 250/214 R |
| 6,201,270 B1 | * | 3/2001 | Chen | 257/292 |
| 6,459,077 B1 | * | 10/2002 | Hynecek | 250/208.1 |
| 6,646,247 B2 | * | 11/2003 | Hosier et al. | 250/208.1 |

* cited by examiner

Primary Examiner—Wendy R. Garber
Assistant Examiner—Rashawn N Tillery
(74) Attorney, Agent, or Firm—R. Hutter

(57) ABSTRACT

In a photosensitive apparatus having photodiodes, such as a photosensor chip used in digital office equipment, a "fat zero" initial bias is injected on the photodiode. With every cycle of operation, a first fat zero is placed on the photodiode and then sampled. Then, a second fat zero is placed on the photodiode just before the integration of a light signal from an image being recorded. The light signal plus the second fat zero is transferred out of the photodiode and the sampled signal is subtracted therefrom, leaving only the light signal. The system obviates both fixed-pattern and some thermal noise within the apparatus.

15 Claims, 3 Drawing Sheets

PHOTOSENSITIVE APPARATUS WHEREIN AN INITIAL CHARGE ON A PHOTODIODE IS SAMPLED AND SUBSTRACTED DURING READOUT

CROSS-REFERENCE TO RELATED APPLICATION

Cross-reference is hereby made to the following patent application, assigned to the assignee hereof and filed simultaneously herewith: "Photosensitive Apparatus in which an Initial Charge on a Photodiode is Sampled and then Retransferred to the Photodiode," now U.S. Pat. No. 6,646,247.

INCORPORATION BY REFERENCE

The following U.S. patent applications, all assigned to the assignee hereof, are hereby incorporated by reference: 5,081,536; 5,105,277; and 5,148,268.

FIELD OF THE INVENTION

The present invention relates to image sensor devices, such as used in, for example, digital cameras or document scanning devices, and in particular to apparatus having an array of photodiodes outputting to an output line through CMOS circuitry.

BACKGROUND OF THE INVENTION

Image sensor arrays, such as found in digital document scanners and digital cameras, typically comprise a linear array of photosites which raster scan a focused image, or an image bearing document, and convert the set of microscopic image areas viewed by each photosite to image signal charges. Following an integration period the image signal charges are amplified and transferred to a common output line or bus through successively actuated multiplexing transistors.

Currently there are two generally accepted basic technologies for creating such linear arrays of photosites: Charge-coupled devices, or CCD's, and CMOS. In CMOS, the photosensors are in the form of photodiodes, which output a charge in response to light impinging thereon. In the scanning process, bias and reset charges are applied in a predetermined time sequence during each scan cycle. Certain prior art patents, such as U.S. Pat. No. 5,081,536 assigned to the assignee hereof, disclose two-stage transfer circuits for transferring image signal charges from the photosites in CMOS image sensors.

In designing photosensitive devices using photodiodes, it is desirable to use signals from the photodiodes which are created toward the middle portion of the photodiodes' response, where the response function is highly linear. In other words, light-responsive signals from the lower portion of a photodiode's response tend not to be linear, and thus unreliable as a reflection of the amount of light integrated by the photodiode at a particular time. In order to exploit the more linear middle portion of a photodiode's response, one technique, which is used in the patents incorporated by reference above, is to inject a predetermined bias charge, or "fat zero," onto the photodiode with each cycle of operation wherein light energy is integrated as a charge on the photodiode and then transferred through a transfer circuit. The fat zero bias in effect "primes the pump" of charge within the photodiode so that the nonlinear portions of the photodiode response are not used.

In practical applications of photosensitive devices using fat zero bias, two key sources of noise, which can affect the integrity of the output image signals, are "fixed pattern noise" and "thermal noise." The first of these types of noise relates to the fact that, within any device, individual photodiodes and sets of circuitry associated with the various photodiodes will have some variation in performance, and the variation in performance among the different sets of circuitry will result in a fixed pattern of noise effecting the signals, resulting in a consistent pattern of distortions in the output signals, depending on which specific set of circuitry a particular subset of the video signals passes through. Thermal noise is created by the fact that the output of a particular set of circuitry is likely to change over time, due to the random thermal movement of electrons in conductors.

It is an object of the present invention to overcome these customary sources of noise by sampling actual values of charge placed on photodiodes during the course of operation of an apparatus, and then using these actual sampled values to correct subsequent video signals.

DESCRIPTION OF THE PRIOR ART

U.S. Pat. No. 5,081,536 discloses the basic architecture of a transfer circuit which injects a bias charge onto a photodiode in a CMOS-based image sensor array. U.S. Pat. No. 5,105,277 represents an improvement to the '536 patent, in which split clock transistor actuating pulses are applied to the transfer circuit, to cancel variations among a large number of photodiodes.

U.S. Pat. No. 5,812,703 discloses an imaging apparatus, such as a digital camera, in which the fixed-pattern noise inherent to a particular apparatus in taken into account by storing in a non-volatile memory noise data for every photosensor of the apparatus.

SUMMRAY OF THE INVENTION

According to one aspect of the present invention, there is provided a method of operating a photosensitive apparatus having at least one photodiode. A first bias charge is injected onto the photodiode. The first bias charge on the photodiode is then sampled, yielding a sampled signal. A second bias charge is injected onto the photodiode, and then a light signal is integrated on the photodiode. The light signal and the second bias charge are transferred from the photodiode, and the sampled signal is subtracted from the light signal and the second bias charge.

According to another aspect of the present invention, there is provided a method of operating a photosensitive apparatus having at least one photodiode and a capacitor associated with the photodiode. A first bias charge is injected onto the photodiode, and then transferred from the photodiode to the capacitor. A second bias charge is injected onto the photodiode. The second bias charge is transferred in combination with a light signal from the photodiode to the capacitor.

According to another aspect of the present invention, there is provided a photosensitive imaging apparatus, comprising a plurality of cells, each cell corresponding to a small area of an image to be recorded. Each cell includes at least one photodiode, a sampling capacitor associated with the photodiode, means for injecting a bias charge onto the photodiode, and means for transferring charge from the photodiode onto the sampling capacitor.

Figure 1:
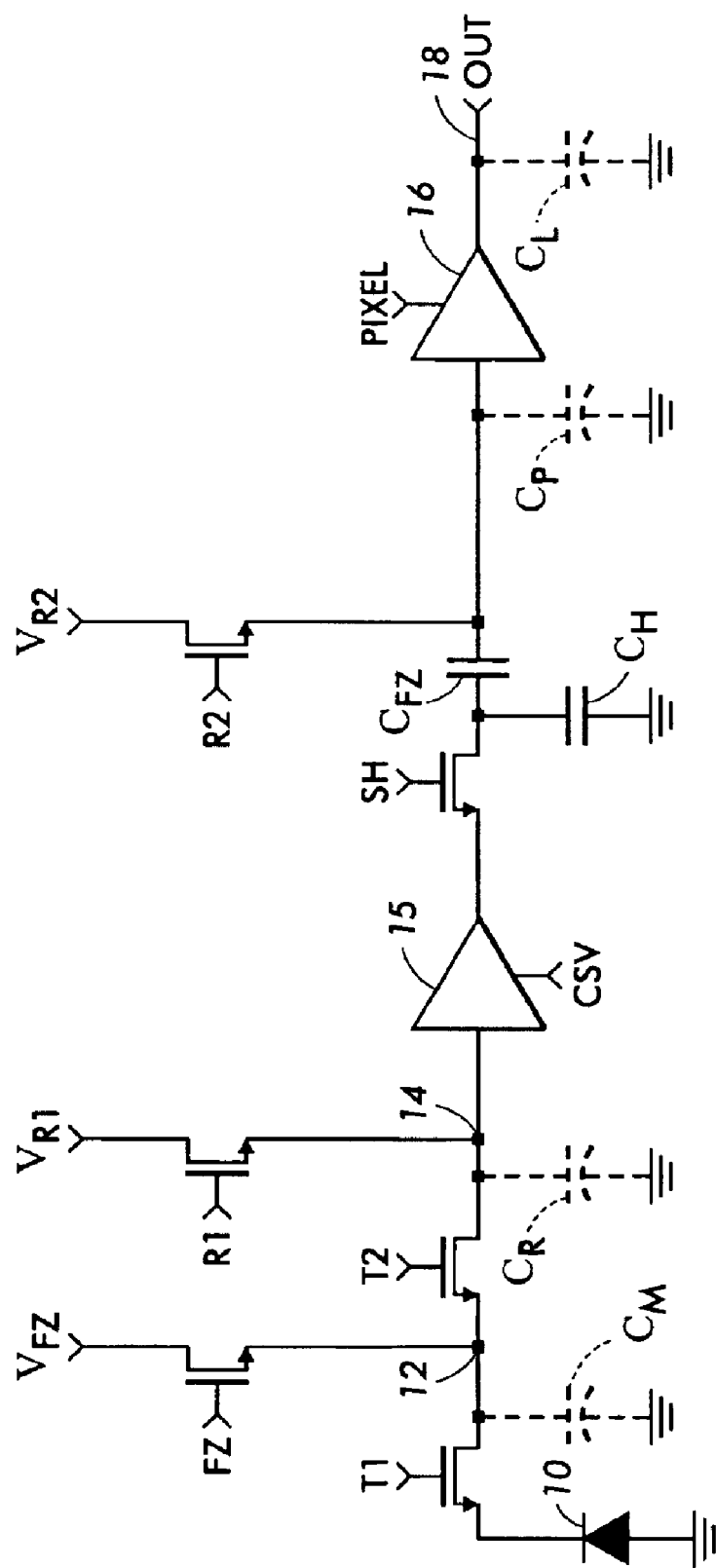
FIG. 1 is a schematic diagram of a single photosensor "cell" according to one aspect of the present invention.
Figure 2:
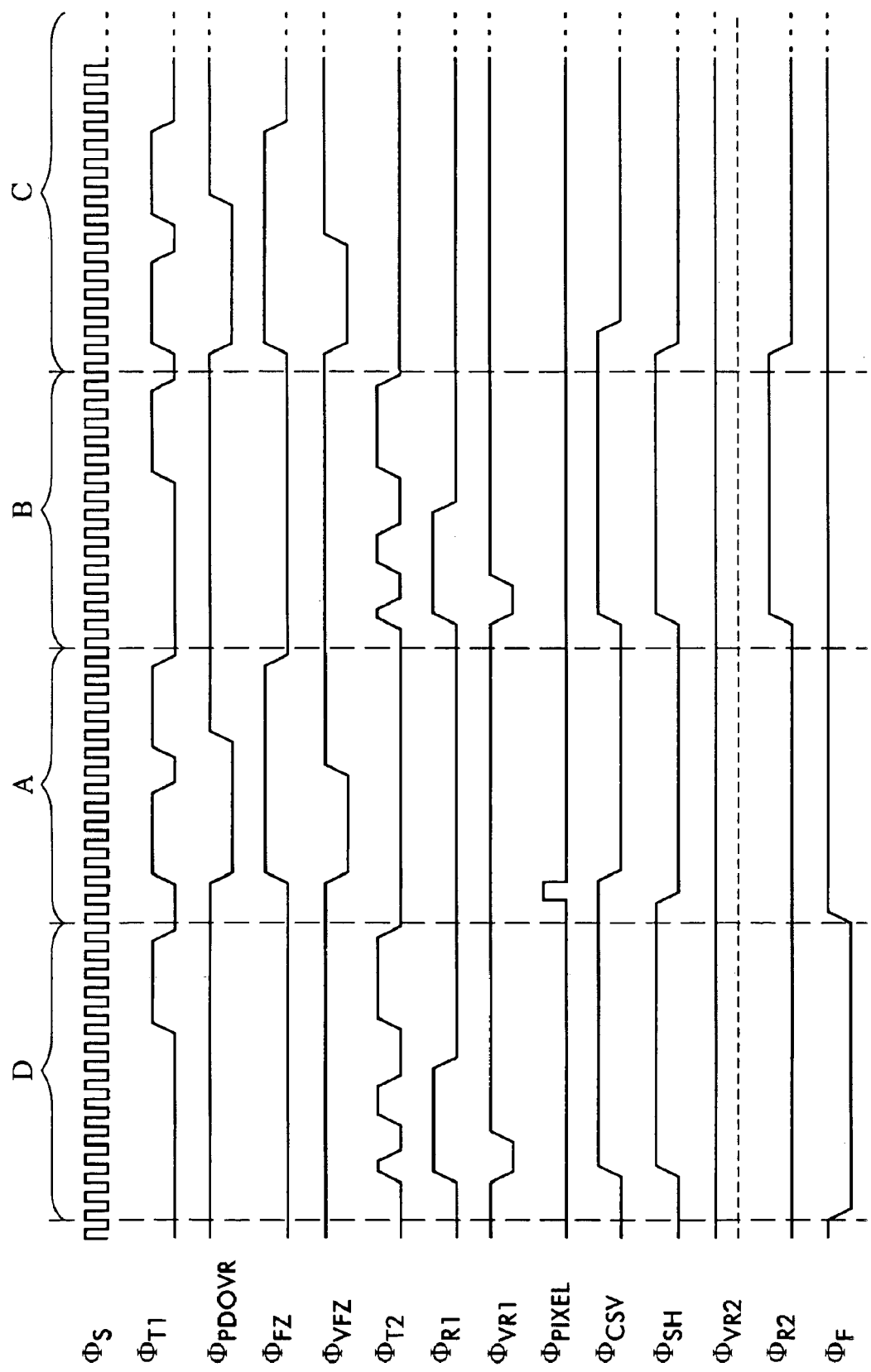
FIG. 2 is a set of comparative timing diagrams showing the overall operation of the circuit of FIG. 1 according to one embodiment of the present invention.

In the convention of this specification, an element in FIG. 1 will be referred to by a set of letters, while the signal in FIG. 2 which operates the element will be referred to as φ with the letters as a subscript, so that, for example, a transistor called SH will be operated by signals called $\phi_{SH}$.

DETAILED DESCRIPTION OF THE INVENTION

In the following description, certain conventions will be used. In the following schematic diagrams and timing diagrams, the same index will apply both to an indicated circuit element in the schematic and to the potential or other signal in the timing diagram associated with the indicated circuit element.

FIG. 1 is a schematic diagram of a single photosensor "cell" according to one aspect of the present invention. A large number of cells (such as several hundred) are typically used in a full-color document scanner. The cell includes at least one photodiode, indicated as 10, and an associated transfer circuit. This transfer circuit includes all of the various gates shown in the Figure, and in particular, a middle node 12, reset node 14, low-power amplifier 15, output amplifier 16, and an output line 18, which will ultimately connect to image-processing circuitry, during a read out by a shift register (not shown). The node capacitances such as marked as $C_M$, $C_R$, $C_P$, and $C_L$ can be purely parasitic, or can be designed to have certain values. The overall function of the transfer circuit in a photosensor chip is described in detail in, for example, U.S. Pat. No. 5,105,277, incorporated by reference above.

Although the basic operation of the transfer circuit is given in detail in the patent incorporated by reference, in brief, the middle node 12 serves as a location in which a "fat zero" bias charge injection, such as indicated as $V_{FZ}$ in the Figure, can be injected onto a photodiode 10. As described in the patents incorporated by reference, the purpose of this bias charge injection is to cause the photodiode to output a signal in a linear range. Downstream of the middle node 12, the reset node 14 and its associated circuitry allows a reset voltage $V_{R1}$ to be placed on the transfer circuit, $V_{R1}$ being of such a magnitude as to draw a signal from the photodiode 10 through the transfer circuit, ultimately through amplifier 16 and onto output line 18.

With particular reference to the Figure, there are further provided circuit elements which facilitate the present invention in this embodiment. These circuit elements are indicated by the signals which operate them, as will be described below. The basic fat-zero transfer circuit is characterized by transistors T1 and T2, while the fat zero voltage $V_{FZ}$ is injected onto the photodiode by activation of the transistor FZ. The basic transfer circuit is reset, as described in the above-referenced patents, by voltage $V_{R1}$ when the transistor R1 is activated.

The circuit elements for sampling and temporarily storing fat-zero bias charge injections are capacitor $C_{FZ}$, corresponding to what is in some claims below called a sampling capacitor, which is attached at a first side thereof by a sample and hold transistor SH, and on the second side thereof by a second reset voltage $V_{R2}$, activated by transistor R2. There are also parasitic capacitances on either side of capacitor $C_{FZ}$, which have to be taken into account to obtain desirable performance. The sample and hold capacitor, $C_H$, is used to minimize the effect of the coupling of charge from the SH transistor's parasitic gate to drain capacitance. This coupling could be nonlinear with signal and also cut into signal range, and therefore is undesirable.

The operation of the various circuit elements at predetermined times is carried out by a clocking means (not shown) ultimately connected to each contact in FIG. 1, the essential nature of which is known in the art. Such clocking means could comprise, for example, a suitably programmed general-purpose microprocessor.

The overall operation of the circuit of FIG. 1 with regard to the present invention can be summarized as follows, and with specific reference to FIG. 2, which is a comparative timing diagram showing the operation of the various transistors when operating the circuit of FIG. 1 according to one embodiment of the present invention. In FIG. 2, the major events of the method of the described embodiment are indicated by time periods A, B, C, D (as will be understood, the sequence of operations in FIG. 2 occur on a repetitive basis when the apparatus is used for continuous monitoring of an image over time, such as in a image input scanner where an image moves relative to the photodiode).

During period A, the photodiode 10 has an initial fat zero charge from source $V_{FZ}$ placed thereon by the operation of transistors FZ and T1. This fat zero charge is used to "prime the pump" of the photodiode, or in other words cause the photodiode to operate in the linear middle section of its response curve, as described in the patents referenced above.

In period B, the other nodes in the cell are reset, and fat zero charge from the photodiode is transferred out to the reset node 14, causing a total voltage $V_{R1}+V_{FZ}$ to be buffered by the low-power amplifier 15 and stored on the capacitor $C_{FZ}$ as what can be called a "sampled signal." At the same time, a reference voltage from source $V_{R2}$ is applied to the other side of $C_{FZ}$. At period C, a fat zero bias is again placed in the photodiode 10, and at this point the integration period, that is the portion of the cycle of operation wherein light impinging on the photodiode 10 is integrated as a usable light signal, can begin.

After the integration time, at period D, the intermediate nodes in the cell are reset to cause the transfer of the resulting integrated light signal (Vsig) to the reset node. The total voltage on the reset node at this point, $V_{R1}+V_{FZ}+Vsig$, is buffered to the $C_{FZ}$ capacitor, but at this point in the cycle of operation, the other side of $C_{FZ}$ is left floating, or in other words the transistor R2 is not active. The resulting signal at the pixel amplifier 16 will be $V_{R2}+Vsig$, since the previously stored charge on capacitor $C_{FZ}$ subtracts $V_{R1}+V_{FZ}$ from $V_{R1}+V_{FZ}+Vsig$. The sampled signal, which is equal to the original fat zero charge, is thus removed with every cycle of operation.

Put in more basic terms, the operation of the above described embodiment is as follows. With each cycle of operation, the fat zero charge is injected onto the photodiode and then sampled, in this case, on $C_{FZ}$. Another fat zero is placed on the photodiode prior to integrating of a signal charge. The sampled fat zero charge is thus held and subtracted from the combined fat zero plus signal output within the same cycle. Because the first, sampled fat zero and second, actually-used fat zero are experienced by the same set of circuit elements, fixed-pattern noise associated with the particular set of circuit elements is obviated: the initial fat zero sampling can be considered an "experimental control." Because the two fat zero injections occur very closely in time, some components of thermal noise are obviated. However, the photodiode kT/C noise component in the final signal is increased by approximately the square root of two.

To clarify the structure and function of the illustrated embodiment with regard to the claims below, when a charge is read through amplifier 15 and stored on the capacitor $C_{FZ}$, in this embodiment, strictly speaking the output of amplifier 15 is not the charge directly from the photodiode 10 but rather an output related to, or representative of, the charge from the photodiode which is retained on reset node 14 and input to amplifier 15. Nonetheless, the effect of reading charge through amplifier 15 and storing it on $C_{FZ}$ is that the charge on photodiode 10 is sampled and stored, such as for future use when subtracting the stored charge value in a later readout process.

In a practical design, overall responsivity of the cell will depend on several factors. The collected charge will be converted to a voltage that will be determined by the reset node capacitance, $C_R$, and that voltage will see the gain of the low power amplifier, the FZ subtraction circuit ($C_{FZ}/(C_{FZ}+C_P)$) and the pixel amplifier. The gain of the amplifiers 15 and 16 can be easily kept near 0.98–0.99, and if $C_{FZ}$ is made 0.5 pF the parasitic capacitance $C_P$ at the amplifier 16 (about 20–25 fF) in the subtraction circuit will not lower the gain of the subtraction circuit below 0.95. The linearity of the transferred signal and the total linear range of the sensor will depend on the amount of fat zero charge injected and the other clocking levels. The power of the low power amp 15 should be kept low enough so that when all amplifiers are "on" the total chip power is not too high, but also high enough for the settling of voltage on the $C_{FZ}$ capacitor.

There are many possible variations of this illustrated embodiment. The photodiode 10 and transistor T1 can be replicated in a single cell for color, or multi-pixel, operation, such as by having three different diodes 10 (each diode filtered to receive a single primary color) and transistors T1 share a single middle node 12. If flexibility with integration time is not needed, the T2 and R1 devices can be removed, and fat zero injection and reset can be done by the FZ device. If one is not very concerned with the coupling of the sample and hold switch (the SH transistor), the holding capacitor, $C_H$, can be removed. If one is very concerned with coupling of the SH transistor, a capacitor equal to $C_H$ can be put on the other side of the switch and a dummy out-of-phase canceling transistor can be attached to the $C_H$ node. A dummy canceling transistor, matching the R2 transistor, could also be added to the $C_P$ node. The amplifiers can be any type, including a simple source follower. The pixel amplifier 16 could be of a sophisticated design to remove its own offset.

Figure 3:
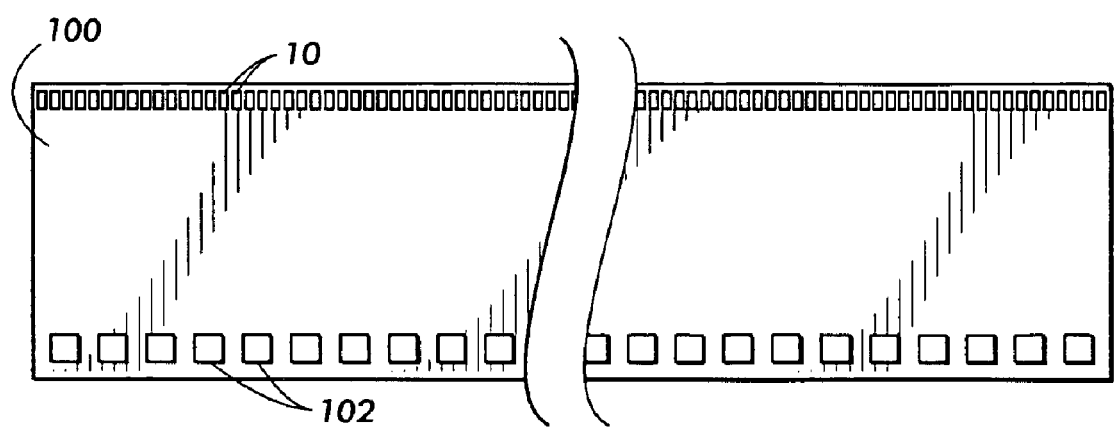
FIG. 3 is a plan view showing the externally-visible portions of a photosensitive apparatus incorporating the present invention.

FIG. 3 is a plan view showing the externally-visible portions of a photosensitive apparatus incorporating the present invention, in this case a chip 100 which could be butted, in a known manner, with other chips of a similar design in, for example, a full-page-width image scanner as used in digital copier or facsimile. As shown, there is provided a linear array of photodiodes 10: each photodiode 10 corresponds to small area of an image to be recorded. In an input scanner, an image on an original sheet to be recorded moves or is moved relative to the array, so that successive small areas of the image are recorded over time. The present invention can apply as well to a color apparatus having three linear arrays of photodiodes 10, each row having a filter associated therewith to pass light of one primary color; in such a case, three photodiodes 10, each filtered for a different color, can share a single middle node 12 and other circuitry to form a single cell. The present invention can also be applied to an apparatus wherein photodiodes are arranged in a two-dimensional array, such as in a digital camera, with rows or columns (or portions thereof) in the array being connected to form cells. Also shown in the Figure are a number of contact pads 102: depending on the particular design of a chip 100 and a larger apparatus in which it is installed, the various voltage inputs such as shown in FIG. 1 can originate off the chip or within the chip, and thus the inputs into pads 102 could be to one or another extent the direct voltage inputs to the cells (with the clocking of individual signals, such as shown in FIG. 2, being done by an external device such as microprocessor), or could simply be controls to an on-chip timing or clocking system which carries out the switching such as shown in FIG. 2.

What is claimed is:

1. A method of operating a photosensitive apparatus having at least one photodiode, comprising the steps of:
    injecting a first bias charge onto the photodiode;
    sampling the first bias charge on the photodiode, yielding a sampled signal;
    injecting a second bias charge onto the photodiode;
    integrating a light signal on the photodiode;
    transferring the light signal and the second bias charge from the photodiode; and
    subtracting the sampled signal from the light signal and the second bias charge.

2. The method of claim 1, the sampling step including storing the sampled signal on a capacitor.

3. The method of claim 2, the subtracting step including reading out the light signal and the second bias charge through the capacitor having the sampled signal thereon.

4. The method of claim 2, the storing step including the step of placing a predetermined reference voltage on a second side of the capacitor when the sampled signal is transferred to a first side of the capacitor.

5. A method of operating a photosensitive apparatus having at least one photodiode and a capacitor associated with the photodiode, comprising the steps of:
    injecting a first bias charge onto the photodiode;
    transferring the first bias charge from the photodiode to the capacitor;
    injecting a second bias charge onto the photodiode; and
    transferring the second bias charge in combination with a light signal from the photodiode to the capacitor.

6. The method of claim 5, further comprising the step of placing a predetermined reference voltage on a second side of the capacitor when the first bias charge is transferred to the capacitor on a first side of the capacitor.

7. The method of claim 6, wherein, when the second bias charge is transferred to the capacitor on a first side of the capacitor, a second side of the capacitor is caused to float.

8. The method of claim 1, further comprising the step of reading out a resulting charge on the capacitor as an image signal.

9. The method of claim 1, the apparatus further comprising an amplifier disposed between the photodiode and the capacitor.

10. The method of claim 1, the apparatus further comprising a holding capacitor disposed in parallel between the photodiode and the capacitor.

11. A photosensitive imaging apparatus, comprising a plurality of cells, each cell corresponding to a small area of an image to be recorded, each cell including at least one photodiode, a sampling capacitor in series with the photodiode, means for injecting a bias charge onto the photodiode, and means for transferring a charge from the photodiode onto the sampling capacitor.

12. The apparatus of claim 11, further comprising means for placing a predetermined reference voltage on a second side of the sampling capacitor in a cell when charge is transferred to the sampling capacitor on a first side of the sampling capacitor.

13. The apparatus of claim 11, each cell further including an amplifier disposed between the photodiode and the sampling capacitor.

14. The apparatus of claim 11, each cell including a second capacitor in parallel with the at least one photodiode.

15. The apparatus of claim 14, the second capacitor being disposed between the amplifier and the sampling capacitor.

* * * * *